United States Patent [19]
Harz

[11] 3,749,990
[45] July 31, 1973

[54] BRUSHLESS ROTARY CONVERTER FOR CONTINUOUS SPEED CONTROL AND SINGLE PHASE ALTERNATING CURRENT

[75] Inventor: Hermann Harz, Berlin 13, Germany

[73] Assignee: Siemens Aktiengesellschaft, Berlin, Germany

[22] Filed: Sept. 10, 1971

[21] Appl. No.: 179,356

[30] Foreign Application Priority Data
Sept. 18, 1970 Germany............ P 20 47 108.3

[52] U.S. Cl. ............................................. 318/166
[51] Int. Cl. ......................... H02p 1/46, H02p 7/36
[58] Field of Search...................... 310/49; 318/138, 318/166, 254, 227, 685, 696

[56] References Cited
UNITED STATES PATENTS

| | | | |
|---|---|---|---|
| 3,547,503 | 12/1970 | Konet............................ | 310/49 R X |
| 3,124,733 | 3/1964 | Andrews........................ | 318/138 |
| 3,535,604 | 10/1970 | Madsen et al................. | 310/49 R X |
| 3,430,083 | 2/1969 | O'Regan....................... | 310/49 R |

*Primary Examiner*—Gene Z. Rubinson
*Attorney*—Arthur E. Wilfond, Herbert L. Lerner et al.

[57] ABSTRACT

A speed-controllable brushless synchronous machine for operating with single phase alternating current has poles and pole gaps which differ in number in the stator and rotor. The pole windings of the stator poles are sequentially connected to the single phase line via thyristors when the angle of mutual overlap of the stator and rotor poles has a specific magnitude.

9 Claims, 9 Drawing Figures

BRUSHLESS ROTARY CONVERTER FOR CONTINUOUS SPEED CONTROL AND SINGLE PHASE ALTERNATING CURRENT

The invention relates to a brushless rotary converter. More particularly, the invention relates to a brushless rotary converter for continuous speed control and single phase alternating current.

Synchronous rotary converters of the reluctance type are known which have a windingless rotor constructed like a pole wheel with poles and pole gaps. The D C excited stator additionally carries a multiphase working winding which is supplied with a multiphase current of controllable frequency and voltage via an intermediate DC circuit. Controlled rectifiers and inverters must be provided to operate such a machine. A relatively large expenditure is required for controlled rectifiers and inverters, especially for small machines.

My invention concerns a brushless rotary converter of the aforedescribed type for continuous speed control for operation with single phase alternating current of constant frequency. The converter has insulated stacks of rotor and stator laminations.

An object of the invention is to provide a brushless rotary converter which overcomes the disadvantages of known types of similar converters.

Another object of the invention is to provide a brushless rotary converter of simple structure and low cost which eliminates the need for controlled rectifiers and an intermediate DC circuit or DC excitation winding.

Still another object of my invention is to provide a brushless rotary converter having a laminated stator with pole legs and cylindrical pole windings which may be designed like a DC machine, so that it is of highly simple structure and low cost.

Another object of the invention is to provide a brushless rotary converter for continuous speed control with the operating characteristics of a reluctance or repulsion type machine.

Yet another object of the invention is to provide a brushless rotary converter which functions with efficiency, effectiveness and reliability.

In accordance with the invention, the stacks of rotor and stator laminations exhibit uniformly distributed poles and pole gaps, but of different number in each of them. The stator poles have pole windings which are sequentially connected via thyristor AC switches to a single phase line if the mutual overlap angle of the stator and rotor poles has a given magnitude or switching angle which increases with rotation in the motor mode, but decreases in the generator mode of operation. The pole wheel comprises a stack of insulated laminations having uniformly distributed poles and pole gaps and a multiphase stator winding, the phases of which are supplied sequentially with single phase alternating current of constant frequency such as, for example, line frequency. It is essential to the present invention that the pole windings be connected in time sequence by means of thyristor AC regulators to a one phase system, and that the mutual overlap angle of the stator and rotor pole surfaces amounts to a certain magnitude. The result being, that there is a magnitude increase with rotation during motor operation and a corresponding decrease during generator operation.

The number of poles of the stator and the rotor is different; they therefore differ by at least one, so that the same magnetic reluctance never prevails under the individual poles, which is necessary for the operation of the machine. A stator winding is switched on, energized or excited only if the stator and rotor pole surfaces overlap to a greater or lesser extent, so that the full pole cross-section is never available to the flux when the stator pole winding in question is energized. Since the flux is determined by the applied voltage and frequency, the induction must increase rapidly in the case of a small available cross-section, and consequently a large peripheral force and a large torque are developed, so that the rotor turns.

The more the pole surfaces of the stator and the rotor overlap, that is, the better the magnetic permeance, the more the induction and the torque decrease. In the case of full overlap, the torque becomes zero, since the magnetic energy in the air gap, as the source of the force developed, then no longer changes. The stator pole winding, which up to then had carried current, may be disconnected or deenergized.

In the meantime, however, the same small initial pole overlap has occurred in an adjacent pole as in the pole that had been active up to then, so that upon switching on or energizing the associated stator pole winding a large torque is again developed, and in this manner the process is repeated for all the successive poles on the circumference. The rotor is therefore subjected to a torque which is distributed over the circumference and varies in time. The magnitude of the torque when the stator pole winding in question is energized depends upon the overlap of the stator and rotor pole surfaces at which said winding is energized. Motor action occurs if the overlapping pole area increases with rotation, and generator action occurs if the overlapping pole area decreases with rotation. The aforementioned operation employs a thyristor control dependent on the overlapping cycle and produces a reluctance by means of a simple construction arrangement i.e. an effective air gap and only one pole winding per stator pole. Furthermore, since the apparatus of the instant invention is energized by one-phase alternating current of constant frequency, both half oscillations of the alternating currents and the corresponding fluxes occur in both directions. The output of the electronic switches as described in more detail hereinafter, is extremely low since only conventional thyristors without forced quenching (forced commutation) are necessary.

In order that the invention may be readily carried into effect, it will now be described with reference to the accompanying drawings, wherein.

Figure 1:
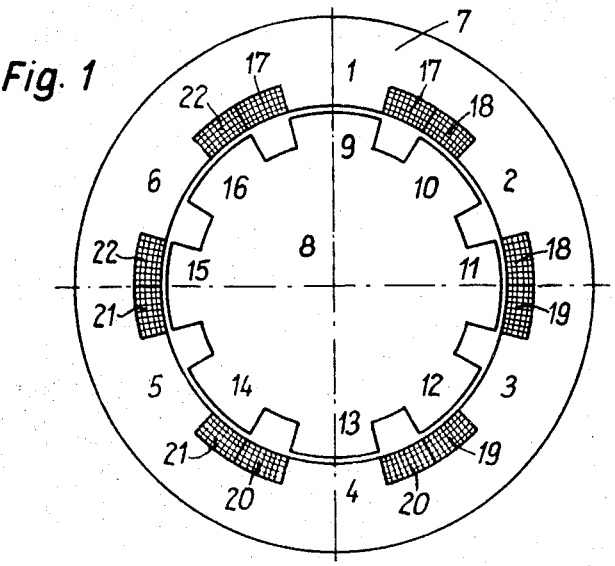
FIG. 1 is a schematic diagram of a radial cross-section of an embodiment of the brushless rotary converter of the invention.

FIG. 1 is a schematic diagram of a radial cross-section through a machine of the invention. The machine has a stator lamination stack 7. In the conventional sense it would be a two pole machine. The stator 7 has poles 1, 2, 3, 4, 5, 6. The stator lamination stack 7 has an axial bore formed therethrough in which a windingless pole wheel 8 is rotatably mounted. The pole wheel 8 comprises stacked insulated laminations and has eight uniformly distributed pole projections 9 to 16. Pole gaps without windings are provided between the pole projections of the rotor 8.

Cylindrical pole windings, such as are commonly utilized in DC machines, are provided on the stator poles 1 to 6. The pole 1 has a winding 17 mounted thereon. The pole 2 has a winding 18 mounted thereon. Windings 19, 20, 21 and 22 are mounted on the poles 3, 4, 5 and 6, respectively.

Figure 2:
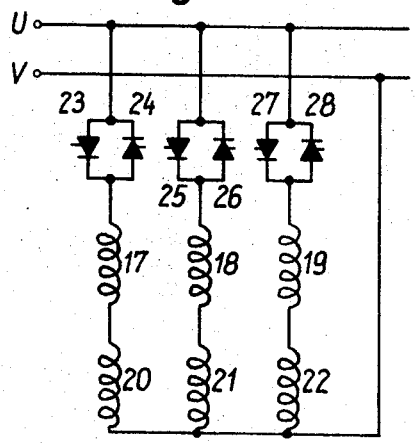
FIG. 2 is a circuit diagram of the connection of the stator windings of the embodiment of FIG. 1.

As shown in FIG. 2, the windings 17 and 20 are connected in series and are connected between the phases U and V of a single phae system via two thyristors 23 and 24 connected in anti-parallel. The windings 18 and 21 are connected in series and are connected between the phases U and V of the system via thyristors 25 and 26 connected in anti-parallel. The windings 19 and 22 are connected in series and are connected between the phases U and V of the system via thyristors 27 and 28.

In FIG. 1, each of the poles of the stator extends over 30° of the circumference, and the pole gaps are of the same width. Each of the rotor poles has a width of 30°, but the pole gaps between said rotor poles are only 15° wide.

The brushless rotary converter of FIG. 1 operates as follows: In FIG. 1, the pole wheel 8 is shown in such a position that the mutual overlap between the stator pole 2 and the rotor pole 10 is one half or 15°. This is also true for the poles 5 and 14. If the pole windings 18 and 21 are then switched on or energized via the thyristors 25 and 26, they are penetrated by a steady flux which depends upon the line voltage and the line frequency and which must return via the narrow cross-section, corresponding to about half the pole area, and thereby brings about a correspondingly high induction in the air gap.

Figure 3:
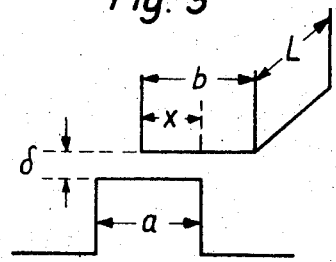
FIG. 3 is a schematic diagram illustrating the derivation of the magnetic energy of the machine of the invention.

The peripheral force exerted on the pole wheel is obtained from the change of the magnetic energy stored in the air gap. If the pole width of the rotor is $a$, the pole width of the stator is $b$, the width of the air gap is $\delta$ and the length of the stack of laminations is L, all dimensions being in meters, as shown in FIG. 3, the magnetic energy in the air gap under a pole, if the induction is in tesla T, is $$A = (10/8 \, \pi) \, [(B_o \, x_o)/x]^2 \times L \, \delta \, 10^6 \tag{1}$$

wherein $A$ is in $nm$, $B_o \, x_o \, L$ corresponds to the flux prescribed by the applied voltage and $x_o$ represents the pole arc of the mutual overlap of the stator and rotor surfaces at the time when the winding is energized. If Equation (1) is differentiated with respect to $x$, the electromagnetically generated peripheral force exerted on the pole wheel is obtained as $F_{em} = dA/dx = (10/8 \, \pi) \, B_o^2 \, L \, \delta \, [(x_o/x)]^2 \, 10^6$ (2)

wherein $F_{em}$ is in $n$.

For a bore diameter of $d = 0.3$ m, six stator poles having a pole angle of 30°, a pole width $b = 0.3 \, \pi \, 30/360 = 0.079$ m, and a pole overlap of 15° provides a value $x_o = 0.0395$ m. If $\delta = 0.005$ m and $B_o = 1.42$ T, the peripheral force, when the two windings 18 and 19 are energized, is $$F_{em} = (0.4) \, (1.42)^2(0.3) \, (0.005) \, (L)10^6$$
$$= 1200 \, n$$
$$= 122 \, kp$$

Since, however, in addition to the winding 18, the winding 21 is also in the circuit, the corresponding pole 5 of which has the same overlap relative to the rotor pole 14 as the poles 2 and 10, the force is doubled, $$2 \, F_{em} = 2400 \, n = 244 \, kp$$

Figure 4:
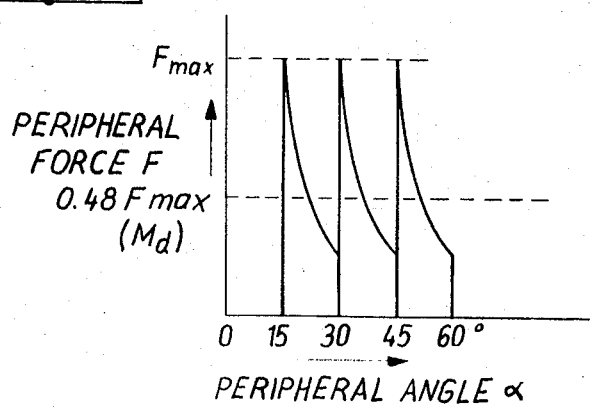
FIG. 4 is a graphical presentation of the peripheral angle versus the peripheral force in the machine of the invention.

FIG. 4 illustrates the peripheral angle $\alpha$ versus the peripheral force.

As seen from FIg. 4, the force and the torque, respectively, fall off according to a square-law hyperbola. After 15°, however, the windings 18 and 21 are disconnected and the windings 19 and 23 are connected via the thyristors 27 and 28 (FIG. 2), so that the poles 3, 11 and 6, 15 then exert the same torque as the poles 2, 10 and 5, 14 did before.

From FIG. 4, about 48 percent of the initial value may be obtained as the mean value of the torque. The torque determined in this manner is related to the maximum value of the flux and to the corresponding induction, which varies according to the overlap. The effective value is only half as large. For a rotor diameter of $d = 0.3$ m, the torque obtained is $$M = (2400)(0.48)(0.5)(0.15) = 86.7 \, nm$$

and the power P at 1,500 rpm is $$P = (86.7)(2\pi/60)(1500)10^3 = 13.5 \, kw$$

Although the efficiency of such a machine may not be particularly high, its design is of extraordinary simplicity and, above all, the cost of thyristors is very low. In the simplest case, four thyristors will suffice if the machine is limited to four stator poles and the corresponding pole windings. The thyristors of my machine are operated as straight AC switches which require no quenching means. A further advantage consists in that operation may be at constant line frequency and also at constant line voltage. The magnitude of the torque depends on the overlap of the stator and rotor pole, that is, the pole wheel angle, at which the pole winding in question is switched into the circuit or energized. If it is energized or connected at a time when the overlap of the corresponding pole surfaces is decreasing from a maximum, the energy stored in the air gap increases and a braking force is exerted on the rotor. The machine then works as a generator. The machine may thus be operated as a motor or as a generator, depending on the point in time at which the pole windings of the stator are energized and deenergized.

It is advantageous to control the thyristors by pulse generators such as, for example, Hall effect generators, which are coupled to the rotor. The firing pulses are transmitted to the thyristors by stationary, but rotatable, setting devices. It is basic to the operation of the machine that the attainable maximum speed depends upon the frequency of the supply system. On the other hand, starting presents no problems, since there is no intermediate DC circuit. For starting, the operator may proceed so that at the instant of switching the corresponding pole overlap is small enough to generate a particularly high induction and a consequently large starting torque. In the embodiment of FIG. 1, for example, this would mean that the pole windings 18 and 21 are already energized when the pole overlap is less than 15°, as shown in FIG. 1.

The fact that in starting and at low speeds the supply frequency is high as compared to the frequency of rotation of the machine, makes it particularly suitable for low speed drives. Such drives may comprise, for example, rotary cement kilns, which nowadays are driven, without the insertion of the otherwise commonly used transmissions, by synchronous motors which are fed by a direct-acting converter, without an intermediate DC circuit, at very low frequencies and voltages. The cost of such direct-acting converters is considerable, since there are 36 thyristors in a three phase system.

Figure 5:
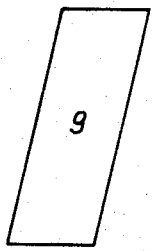
FIG. 5 is a schematic top view of a rotor pole of FIG. 1 having skewed pole piece edges.

In order to achieve greater uniformity of the torque, the rotor or the stator may be provided with skewed pole piece edges. FIG. 5 is a top view of a rotor pole provided with such skewed pole piece edges. More specifically, FIG. 5 is a top view of the pole 9 situated on top in FIG. 1.

Figure 6:
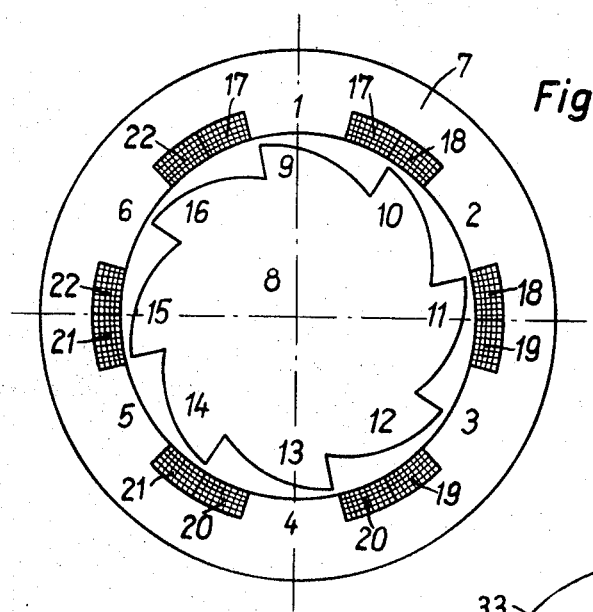
FIG. 6 is a schematic diagram of another embodiment of the brushless rotary converter of the invention in which the air gap varies over the width of a pole.

FIG. 6 shows another example of an embodiment of the invention. In FIG. 6, the stator lamination stack 7 of the machine is designed in the same manner as shown in FIG. 1. The reference symbols of FIGS. 1 and 6 are therefore the same. In FIG. 6, the design of the pole wheel 8, however, is different. The air gap under the poles is not constant, but changes due to the special design of the surface of the pole extensions 9 to 16 of the rotor according to a curve such as, for example, a spiral. In this manner, the torque is smoothed out during the time that the pole windings are energized or ON.

Furthermore, a second stack of stator laminations with the same number of poles and windings may be provided. The second stack may be displaced relative to the first one by one pole pitch. If machines with sufficiently large diameter are involved, several sets of stator poles, for example, six each, may be arranged at the periphery correspondingly staggered, and in this manner the torque may be smoothed.

In the machine of FIG. 1, the pole fluxes are not linked that is, the flux is returned via at least two poles which are energized at a time, for example, from pole 1 via pole 4, from pole 2 via pole 5, and so on. The fluxes may, however, also be linked by returning the flux of an energized pole via unenergized adjacent poles. Such an embodiment is shown in FIG. 7.

Figure 7:
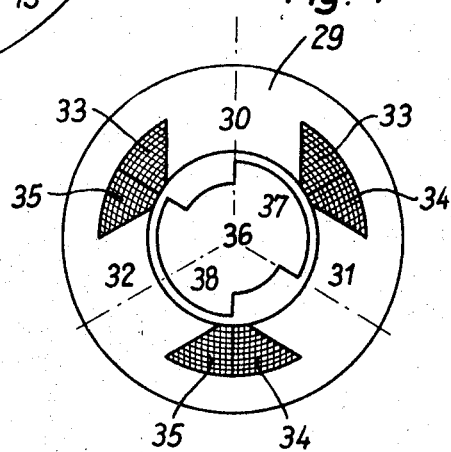
FIG. 7 is a schematic diagram of a radial cross-section of another embodiment of the brushless rotary converter of the invention.

In FIG. 7, a stack of stator laminations 29 has three poles 30, 31 and 32 having associated or corresponding pole windings 33, 34 and 35. A pole wheel 36 has two poles 37 and 38 between which corresponding pole gaps are provided. If the pole windings are energized sequentially at a time when the stator and rotor poles overlap only partially, a torque acting in the desired direction may be produced. Due to the change of the air gap energy, accelerating or decelerating torques may be produced under the non-energized poles. Since the inductions are small, as compared to the energized pole which carries the entire flux, these torques do not show up particularly.

In the embodiments hereinbefore described, the rotors has no windings, but only poles and pole gaps, that is, zones with good and poor magnetic permeance. In lieu of the pole gaps, however, shot-circuit loops of high electrical conductivity may be provided on the periphery of a rotor made without pole gaps. The short-circuit loops, however, must be insulated from the stack of rotor laminations. The short-circuit loops may, for example, consist of metal sheets of copper or aluminum which are distributed uniformly over the circumference of the rotor. The number of short-circuit loops corresponds to the number of the rotor poles. However, the short-circuit loops may also comprise metal rods in slots which are connected on the end faces by straps to form short circuited cages. Such short-circuit loops act like pole gaps. 1 rotor No appreciable flux can penetrate at these points, because this is prevented by the counterflux prevailing there.

A small flux is sufficient to generate the counterflux which is branched off from the main flux and which covers the voltage drop produced in the short-circuit loop by the counterflux.

The peripheral force $F_{ed}$ produced electrodynamically by a current I in amperes in the short-circuit loop in a field having an induction B in tesla over a length L in meters is indicated by the relation $$F_{ed} = B I L \qquad (3)$$

in n. At an increasing overlap, the induction, the peripheral force and the torque decrease as indicated in Equation (3).

Figure 8:
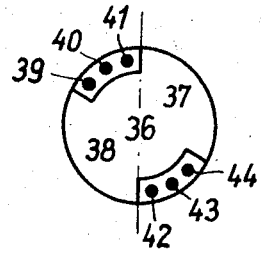
FIG. 8 is a schematic diagram of the rotor in radial cross-section of still another embodiment of the brushless rotary converter of the invention.

FIG. 8 shows the rotor 36 of the embodiment of FIG. 7 in a form modified in the aforedescribed manner. In the embodiment of FIG. 8, the pole wheel has no pole gaps. Instead, rods 39, 40 and 41 are inserted, insulated, in slots on one side of the rotor, and rods 42, 43 and 44 are inserted on the other side of the rotor. Both groups of rods are connected on the end faces by short-circuit straps to form insulated short-circuit grids or partial cages. Since forces and torques are formed by electrodynamic means, in this case, substantially higher values are obtained for both than by electromagnetic means. More particularly, approximately twice the values are obtained for the same values of induction and current as hereinbefore indicated.

Figure 9:
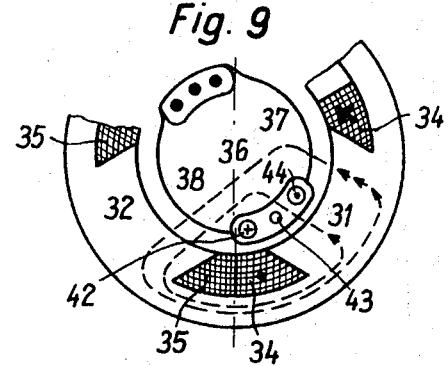
FIG. 9 is a schematic diagram of a radial cross-section of yet another embodiment of the brushless rotary cconverter of the invention.

As hereinbefore mentioned, the voltage drop of the counterflux in a short-circuit loop must be covered by a small secondary flux which is branched off from the main flux and which passes through such loop. The magnetic permeance of the magnetic shunt circuit may be made substantially larger than that of the main circuit, so that a portion as small as possible is allocated to the magnetic shunt circuit. FIG. 9 shows an example of an embodiment in which this is achieved by making the air gap of the rotor above the short-circuit loop as small as possible.

In the embodiment of FIG. 9, wherein the air gap of the rotor above the short-circuit loop is made as small as possible, only a very small portion of the stator flux is lost to the small magnetic reluctance of the shunt circuit and the counterflux may approach the flux through the stator as closely as possible in the short-circuit areas, so that the force exerted also becomes as large as possible. The size of the air gap in the area of the rotor without windings also essentially determines the magnitude of the current drawn by the stator winding and thereby also, after the small share for the shunt circuit is deducted, the magnitude of the counterflux and the torque.

In the machine of FIG.9, the main flux, which is indicated by three arrows, flows via the large air gap under the pole 31. However, only the small flux, indicated by a single arrow, passes through the small air gap and the short-circuit grid 42, 43 and 44. The small flux pproduces the currents indicated by + and · in the short-circuit rods 42 and 44. The current in the rod 44 and the main field produce the torque, while the current in the rod 42 cancels the flux through the winding 34 at this point.

With an initial induction $B_o$, the flux for the magnetic potential in an air gap is $$\theta = H \delta = (10/4 \pi) B_o \delta \, 10^6 \quad (4)$$

in amperes, wherein $B_o$ is in tesla and $\delta$ is in meters.

This flux corresponds to the current I in the associated short-circuit loop, if the component required for the magnetic shunt circuit is ignored. When Equation 4 is substituted in Equation 3, the electrodynamically produced peripheral force is $$F_{ed} = (10/4\pi) B_o^2 L \delta \, 10^6 \quad (5)$$

in n, wherein $B_o$ is in tesla and L and $\delta$ are in meters.

From Equations 2 and 5

$$F_{ed} = 2 F_{em} \quad (6)$$

Thus, for equal stresses and dimensions, the electrocynamically generated torque is twice as great as the electromagnetically generated torque. Although the machine may be operated at constant voltage, varying only the firing angle, which is the pole wheel overlap angle at which the thyristors are fired, it may also operate like an AC series motor or a repulsion motor with variable voltage. The firing angle may remain set at a fixed value, or it may serve for additional control. In this manner, an extremely simple and operationally reliable drive is provided for vehicles and lifting equipment. The drive may be operated with constant or variable voltage from a single phase line, for example, in a railroad system, where it is a particular advantage that the drive can start without loss from the rest position and brake to a stop.

A DC component may develop in the current in the event of continuous energizing of the windings. The DC component is undesirable, since it would increase the induction and the current considerably. In order to prevent the DC component, it would be advisable to control the thyristors in such a manner that the voltage at the windings decreases after energization. This is the case if the line voltage is not set or is fed variably via a transformer to the thyristors or AC switches for amplitude control. However, gate control of the thyristors may be utilized.

In order to properly control the thristors, with no DC component in the current, it is advisable to use an auxiliary voltage which is shifted in time with respect to the line voltage. For uncontrolled operation, or in the case of amplitude control, for example, the auxiliary voltage is shifted 90° in time relative to the line voltage and affects the control of the thyristors if it changes direction after a zero crossing. If gate contol is utilized, the phase shift angle is increased by the gating angle.

While the invention has been described by means of specific examples and in specific embodiments, I do not wish to be limited thereto, for obvious modifications will occur to those skilled in the art without departing from the spirit and scope of the invention.

I claim:

1. In a brushless rotary converter operating with a continuous speed control from single phase alternating current of constant frequency having stacks of insulated stator and rotor laminations wherein: said converter includes a first plurality of uniformly distributed poles and corresponding pole gaps disposed in the stack of stator laminations; a second plurality of uniformly distributed poles and pole gaps formed in said rotor laminations being of a different number from that of said stator laminations; a plurality of pole windings mounted on corresponding poles of said stator laminations, being disposed in corresponding pole gaps of said stator laminations; an air gap between said respective poles of said rotor and said stator; a plurality of thyristor AC switches, and circuit means sequentially coupling said respective pole windings to a single phase system, having thyristor AC switches in anti-parallel circuit relation for energizing said respective pole windings in response to a specific magnitude of the mutual overlap switching angle of said stator and said rotor poles.

2. A brushless rotary converter as claimed in claim 1, wherein said pole gaps in said rotor are free from windings and are relatively large with respect to the air gap at said poles.

3. A brushless rotary converter as claimed in claim !, wherein: electric short-circuit loops are provided in said rotor pole gaps, insulated from the stack of rotor laminations, said rotor pole gaps having air gaps smaller than or equal to the air gaps at said poles.

4. A brushless rotary converter as claimed in claim 1, wherein: magnetic flux produced by an energized stator pole winding returns to said stator through a plurality of stator poles, the windings of which are simultaneously energized and include the same switching angle as said stator pole winding.

5. A brushless rrotary converter as claimed in claim 1, wherein: magnetic flux poroduced by an energized stator pole winding returns to said stator through a stator pole having an energized winding adjacent to stator poles in an unenergized state.

6. A brushless rotary converter as claimed in claim 1, wherein: magnetic flux produced by an energized stator pole winding returns to said stator through a plurality of stator poles, the windngs of which are energized at the same time as said stator pole winding, said windings being provided with a switching angle equal to and adjacent said stator poles, the windings of which are unenergized.

7. A brushless rotary converter as claimed in claim 1, wherein: said poles of one of said stators and said rotors have skewed pole edges.

8. A brushless rotary converter as claimed in claim 1, wherein: said air gap between said respective poles of said rotor and said stator varies over the width of a pole, in accordance with a curve.

9. A brushless rotary converter as claimed in claim 1, wherein: said air gap between the poles of said rotor and said stator varies over the width of a pole, in accordance with a spiral.

* * * * *